US011251733B2

(12) United States Patent
Malrait et al.

(10) Patent No.: US 11,251,733 B2
(45) Date of Patent: Feb. 15, 2022

(54) CONTROL OF A POWER PART OF A VARIABLE SPEED DRIVE BASED ON PREDETERMINED LEVELS OF FLUX

(71) Applicant: Schneider Toshiba Inverter Europe SAS, Pacy sur Eure (FR)

(72) Inventors: François Malrait, Jouy sur Eure (FR); Thomas Devos, Carrières sous Poissy (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 16/943,398

(22) Filed: Jul. 30, 2020

(65) Prior Publication Data

US 2021/0067076 A1   Mar. 4, 2021

(30) Foreign Application Priority Data

Aug. 28, 2019  (EP) .................... 19306037

(51) Int. Cl.
*H02P 21/30* (2016.01)
*H02P 21/22* (2016.01)

(52) U.S. Cl.
CPC .............. *H02P 21/30* (2016.02); *H02P 21/22* (2016.02)

(58) Field of Classification Search
CPC .................. H02P 21/30; H02P 21/22
See application file for complete search history.

(56) References Cited

U.S. PATENT DOCUMENTS

| 2010/0315033 | A1  | 12/2010 | Lu et al. |
| 2015/0155812 | A1  | 6/2015 | Jang et al. |
| 2016/0197566 | A1* | 7/2016 | Alvey ............... H02P 1/423 318/781 |
| 2018/0006591 | A1* | 1/2018 | Sheahan ............ H02P 23/14 |

FOREIGN PATENT DOCUMENTS

EP     2177390     4/2010

OTHER PUBLICATIONS

Extended European Search Report for EP Patent Application No. 19306037.3 dated Feb. 27, 2020, 10 pages.

* cited by examiner

*Primary Examiner* — Zoheb S Imtiaz
(74) *Attorney, Agent, or Firm* — Locke Lord LLP

(57) ABSTRACT

A method for controlling a variable speed drive arranged for powering an electric motor, the variable speed drive comprising a power part and a control part. The method comprises a preliminary phase of storing a set of predetermined levels of flux of the electric motor. Then, during a current phase, the method comprises selecting a level of flux from among the set of predetermined levels of flux and controlling the power part of the variable speed drive based on the selected level of flux as reference value.

9 Claims, 2 Drawing Sheets

CONTROL OF A POWER PART OF A VARIABLE SPEED DRIVE BASED ON PREDETERMINED LEVELS OF FLUX

BACKGROUND

The present invention relates to the control of a variable speed drive, or simply "drive" hereafter, that s arranged for powering a motor.

Different types of drives have been conceived depending on the application and the nature of the motor:
- drives for DC motors;
- frequency converter for an asynchronous AC motor;
- dimmer for asynchronous AC motor;
- drives for a step machine;
- Etc.

A drive comprises a power part and a control part controlling the power part. The power part comprises power electronics elements such as transistors and Insulated Gate Bipolar Transistor, IGBT, and its architecture depends on the application and the nature of the motor that is powered by the drive. The control part may implement a control law, which can be optimized for the application. A target may also be to optimize the energy consumption of the motor for realizing the application.

Energy savings control laws exist, but they raise several issues/shortcomings.

Quadratic voltage profile is a control law that is easy to use, but it is well adapted only for a quadratic load profile starting from torque zero and speed zero up to nominal torque value and nominal speed value. In this control law, the flux level is continuously varying according to the speed. Also, the torque T can be expressed as $T=k*V^2$, where V is the speed and k is a coefficient. If the application is not perfectly quadratic or if there is a change of coefficient k, then the working point of the motor may be outside of the trajectory of the variable speed drive and the control law is not optimal. There is no possibility to correct it so that the quadratic control law lacks flexibility.

A "Nold" control law is based on automatic adaptation of flux depending on torque and is adapted to all types of applications. Again, the flux level is varying continuously and the Nold control law requires dynamic control gain to be set by default. As the function between torque and flux is dynamic and require knowledge of nonlinear magnetic relationship, the flux cannot be controlled with accuracy using this method, and the energy efficiency of the Nold control law is not optimal to anticipate load perturbation or speed change.

There is therefore a need to improve the drive control law in terms of energy efficiency, reactivity and/or flexibility.

SUMMARY OF INVENTION

It is an object of the invention to alleviate at least some of the disadvantages mentioned above.

A first aspect of the invention concerns a method for controlling a variable speed drive arranged for powering an electric motor, the variable speed drive comprising a power part and a control part, the method comprising:
- a preliminary phase comprising storing a set of predetermined levels of flux of the electric motor;
- a current phase comprising:
  - selecting a level of flux from among the set of predetermined levels of flux;
  - controlling the power part of the variable speed drive based on the selected level of flux as reference value.

This allows anticipating, instead of merely reacting as in the prior art solutions, by selecting the most appropriate level of flux for given speed/torque ranges, which is particularly advantageous in the case where trajectory of the motor is known in advance.

According to some embodiments, each predetermined level of flux may correspond to a range of working points of the motor and, upon receiving a command comprising a first working point, a first level of flux corresponding to a range of working points comprising the first working point is selected.

This enables to implement an automatic mode where an optimal level of flux is selected based on the working point.

According to some embodiments, each predetermined level of flux can correspond to a range of working points of the motor and, upon receiving a command comprising a first working point, a first level of flux corresponding to a range of working points comprising the first working point is output to a user, and the level of flux may be selected based on a user input.

This enables to implement a semi-automatic mode where the final selection depends on an operator or user or on an external entity input. Such external entity may be a remote control device, a phone, tablet, or other device providing control commands to coordinate operation and select the level of flux.

In complement, the user input may be an approval of the outputted first level of flux, thereby selecting the first level of flux as reference value to control the power part of the drive.

This enables to implement a semi-automatic mode while minimizing the interactions that are required between the control part and the user.

According to some embodiments, the level of flux may be selected from among the set of predetermined levels of flux based on an input from an operator or from an external entity.

This enables to implement a manual mode.

According to some embodiments, the working point may be defined by a torque value and/or a speed value.

In complement, each predetermined level of flux may be associated with two ranges of working points, including a first range of working points for an increasing level of flux and a second range of working points for a decreasing level of flux.

This enables to optimize the control of the power part.

A second aspect of the invention concerns a non-transitory computer readable storage medium, with a computer program stored thereon, said computer program comprising instructions for, when executed by a processor, carrying out the steps of a method according to the first aspect of the invention.

A third aspect of the invention concerns a variable speed drive arranged for powering an electric motor, the variable speed drive comprising a power part and a control part, wherein the control part comprises:
- a memory storing a set of predetermined levels of flux of the electric motor;
- a processor configured for performing the following operations, during a current phase:
  - selecting a level of flux from among the set of predetermined levels of flux;
  - controlling the power part of the variable speed drive based on the selected level of flux as reference value.

Further objects, aspects, effects and details of the invention are described in the following detailed description of number of exemplary embodiments, with reference to the drawings.

BRIEF DESCRIPTION OF DRAWINGS

By way of example only, the embodiments of the present disclosure will be described with reference to the accompanying drawing, wherein.

DETAILED DESCRIPTION

Figure 1:
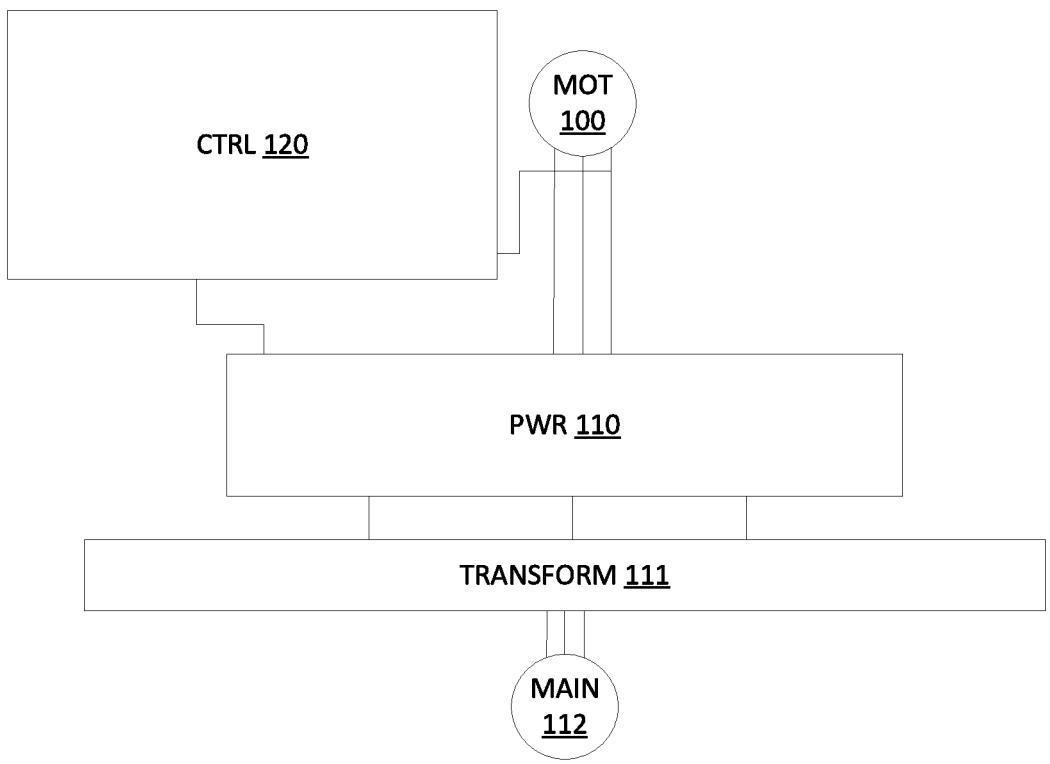
FIG. 1 illustrates a system according to some embodiments of the invention.

Referring to FIG. 1, there is shown a power system for controlling the power delivered to a motor 100 according to some embodiments of the invention.

The power system comprises a variable speed drive, or simply "drive" hereafter, comprising a power part 110 and a control part 120.

The power part 110 can be powered by a transformer 111 connected to a main power network 112, such as three-phase power supply network. Alternatively, the power part 110 can be supplied directly by the main power network 112 or by any other supply source.

The power part 110 may comprise one or several low voltage power cells, according to some embodiments. However, no restriction is attached to the architecture of the power part 110, which depends on the application and the type of motor 100 to which it is connected. Several architectures of variable speed drives are known and will not be further described.

According to the prior art solutions, the control part 120 controls the power part 110 based on a target speed or torque specified in a command received from an external entity or based on a control law. However, the flux continuously varies to reach the target speed or torque values. In addition, such mechanical parameter targets have a different reactivity in reaching the target because flux is dynamically varying in reaction to the modification of the mechanical set point.

Figure 2:
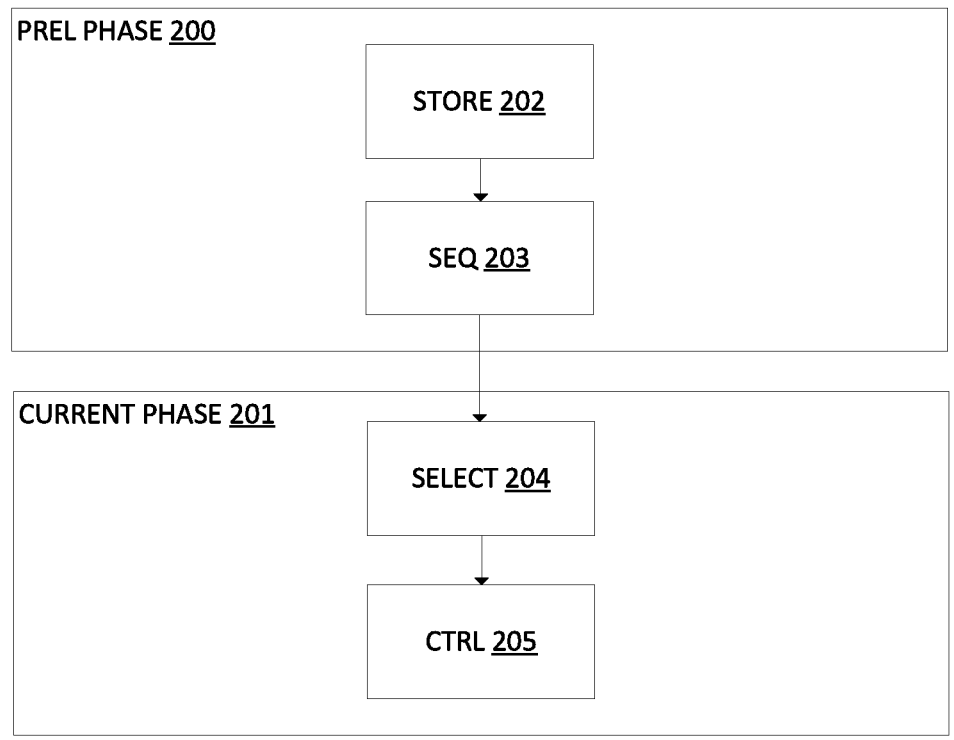
FIG. 2 is a flowchart showing the steps of a method according to some embodiments of the invention.

FIG. 2 is a flowchart showing the steps of a method according to some embodiments of the invention.

The method comprises a preliminary phase 200 and a current phase 201. In the preliminary phase 200 necessary settings and parameters are determined, which are to be available for use in the current phase 201 i.e. operational phase. Hence, the preliminary phase 200 precedes the current phase 201 in which the drive operates to power the motor.

At step 202 of the preliminary phase, a set of levels of flux is determined (predetermined as it is determined during the preliminary phase) and stored in memory of the control part 120. The stored levels of flux may be determined based on criteria that depend on the application and on the type of motor. No restriction is attached to the stored levels of flux.

The levels of flux of the predetermined set can be:
manually defined by an operator during the preliminary phase 200;
determined based on working points input by an operator during the preliminary phase 200; or
defined in advance, by default, by the manufacturer during the preliminary phase 200.

Figure 3:
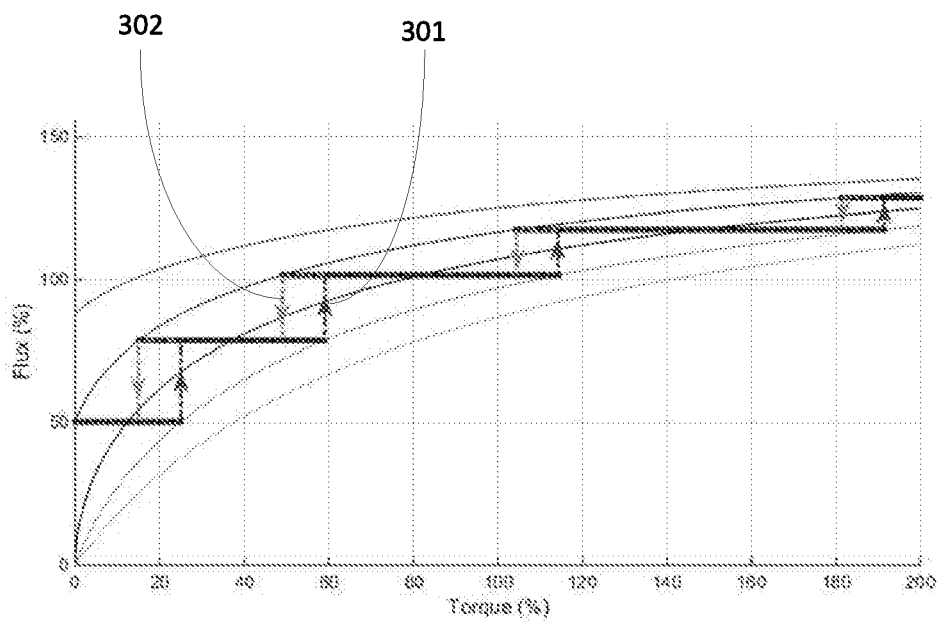
FIG. 3 shows curves representing predetermined levels of flux for different ranges of working points, according to some embodiments of the invention.

On FIG. 3, a working point is defined by a torque value only, not by a speed value. As illustrated on FIG. 3, each level of flux can be associated with at least one range of working points (such as defined by torque values). Each flux level allows to be optimal in energy on the range of torque values to which they are associated.

A level of flux can also be associated with two ranges of torque values (represented on curves 301 and 302), a first range corresponding to an increasing level of flux (curve 301) and a second range corresponding to a decreasing level of flux (curve 302).

More generally than what is described on FIG. 3, each level of flux can be associated with a range of working points comprising couples of torque and speed values.

As shown on FIG. 3, the variations of flux are discontinuous according to the invention, where the flux only takes discrete predetermined levels of flux: this is because the invention proposes to use the flux as reference value for the variable speed drive (and not as a value that is adjusted to reach a reference speed or torque value).

The predetermined flux values can be associated to a control law according to the invention (named "predetermined flux control law" or "preset flux control law" for example) of the variable speed drive. For example, an operator may choose between different control laws (Nold, quadratic, predetermined flux according to the invention, etc.) using a user interface of the variable speed drive. Alternatively, the control law according to the invention can be integrated in an energy control law of an energy control module of the control part, in parallel to a mechanical control law that uses torque or speed values as input and that is implemented by a mechanical control module of the control part. Both the energy and mechanical control modules may control an electrical control module of the control part, which directly controls the power part of the variable speed drive. To this end, the energy control module can provide a flux reference value, selected according to the invention, as input to the electrical control module. The mechanical control module can provide a mechanical reference value to the electrical control module.

Referring back to FIG. 3, at optional step 203 of the preliminary phase, a predetermined sequence of flux levels is stored in a memory of the control part 120. The predetermined sequence comprises associations of levels of flux and time information. Each sequence can be associated with a specific operation/mode of the application of the motor 100.

Optional step 203 applies to a first embodiment where the level of flux is automatically selected based on at least one working point. Before storage of the sequence of flux levels, an operator can input a sequence of working points, and a sequence of flux levels can be deduced based on the sequence of working points and stored in memory. Alternatively, the sequence of working points can be stored instead of the sequence of flux levels, at step 203.

Several sequences may be stored at step 203, in association with the preset flux control law for example. Then, upon selection of the present flux control law, an operator may then select one of the predetermined sequences to be executed.

The current phase 201 comprises a step 204 of selecting a level of flux from among the stored predetermined set of levels of flux and a step 205 of controlling the power part 120 of the variable speed drive based on the selected level of flux as reference value. Reference value designates a target value that the variable speed drive is controlled to reach and maintain.

The invention encompasses several embodiments for selecting the level of flux.

According to a first embodiment, also called "full automatic mode", the selection of a level of flux is performed fully automatically. For example:

the operator or an external entity may select a predetermined sequence to be executed: when at least a sequence has been stored in memory, the level of flux is selected based on a current time and based on the sequence stored in association with time information; or the operator or an external entity may input commands indicating working points of the motor, and levels of flux are automatically selected and used as reference values, based on the working points in the commands.

According to a second embodiment, also called "manual mode", the selection of a level of flux is performed manually by an operator. This may involve the use of a user interface, comprising buttons, a touchpad, a keyboard, a Graphical User Interface and/or any other type of user interface. A list corresponding to the set of predefined levels of flux can be outputted to the user and the user may select of predefined levels of flux to be applied instantly to the power part 120 or to be delayed and executed later at a given date.

According to a third embodiment, also called "semi-automatic mode", an operator or an external entity can input a command indicating a working point of the motor 100 and the control part 120 determines a first level of flux based on the working point indicated in the command. The first level of flux is proposed for selection to an operator or to the external entity, as being optimal for the indicated working point, and the proposed first level of flux may be selected or refused by the operator or the external entity.

Figure 4:
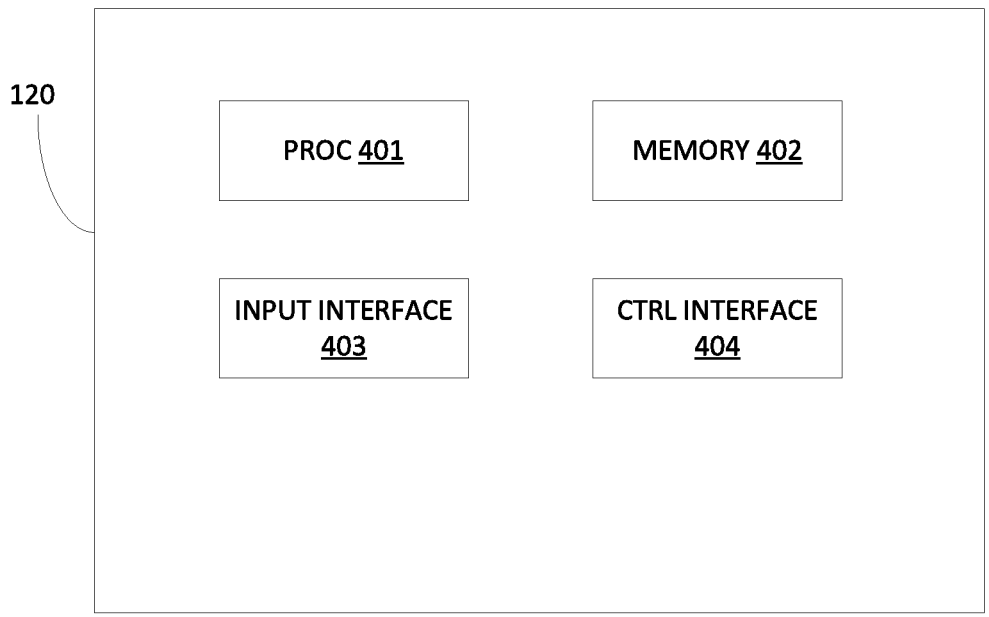
FIG. 4 shows a structure of a control part of a variable speed drive, according to some embodiments of the invention.

Referring to FIG. 4, there is shown a structure of the control part 120, according to some embodiments of the invention.

The control part 120 may comprise a memory 402 and a processor 401, configured for performing the steps of the method described with reference to FIG. 2.

The memory 402 may be any type of memory such as a Random-Access Memory, RAM, a Read-Only Memory, ROM, a flash memory, etc. The memory 402 may store instructions that can be executed by the processor 401 to execute the steps of the method according to the invention. Alternatively, the processor 401 may be replaced by a dedicated electronic circuitry that is designed to execute the steps of the method according to the invention.

The control part 120 further comprises an input interface 403, which can be a user interface or an interface to communicate with an external entity (via a wired or wireless connection for example) to receive commands and inputs. No restriction is attached to what is meant by user interface, which may comprise buttons, a touchpad, a keyboard, a Graphical User Interface and/or any other type of user interface, or any combination of these types of interfaces.

The control part 120 further comprises a control interface 404, which is configured to control the power part 110 based on the level of flux selected by the processor 401. For example, it can control commutations of IGBTs of the power part 110 to achieve a speed/torque command while reaching and maintaining the selected level of flux.

The present invention allows anticipating (and not reacting as in the prior art solutions) by selecting the most appropriate level of flux for given speed/torque ranges, which is particularly advantageous in the case where trajectory of the motor is known in advance.

For example, the trajectory of the motor can ne predetermined and can comprise different phases corresponding to respective operations of the motor and a sequence of levels of flux can therefore be defined and stored in memory.

Also, the reactivity of the control of the power part 110 is increased as flux parameter targets change by anticipation and no more by reaction. Their application allows to be ready for mechanical control, by establishing the flux in the motor by electrical control.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for controlling a variable speed drive arranged for powering an electric motor, the variable speed drive comprising a power part and a control part, the method comprising:
   a preliminary phase comprising storing a set of discrete predetermined levels of flux of the electric motor, wherein the flux only takes discrete predetermined levels of flux and variations of the flux are discontinuous;
   a current phase comprising:
      selecting a level of flux from among the set of discrete predetermined levels of flux;
      controlling the power part of the variable speed drive based on the selected level of flux as reference value.

2. The method according to claim 1, wherein each predetermined level of flux corresponds to a range of working points of the motor and wherein, upon receiving a command comprising a first working point, a first level of flux corresponding to a range of working points comprising the first working point is selected.

3. The method according to claim 1, wherein each predetermined level of flux corresponds to a range of working points of the motor and wherein, upon receiving a command comprising a first working point, a first level of flux corresponding to a range of working points comprising the first working point is output to a user, and wherein the level of flux is selected based on a user input.

4. The method according to claim 3, wherein the user input is an approval of the outputted first level of flux, thereby selecting the first level of flux as reference value to control the power part of the drive.

5. The method according to claim 1, wherein the level of flux is selected from among the set of predetermined levels of flux based on an input from an operator or from an external entity.

6. The method according to claim 2, wherein the working point is defined by a torque value and/or a speed value.

7. The method according to claim 2, wherein each predetermined level of flux is associated with two ranges of working points, including a first range of working points for an increasing level of flux and a second range of working points for a decreasing level of flux.

8. A non-transitory computer readable storage medium, with a computer program stored thereon, said computer program comprising instructions for, when executed by a processor, carrying out the steps of a method according to claim 1.

9. A variable speed drive in charge of powering an electric motor, the variable speed drive comprising a power part and a control part, wherein the control part comprises:
- a memory storing a set of discrete predetermined levels of flux of the electric motor, wherein the flux only takes discrete predetermined levels of flux and variations of the flux are discontinuous;
- a processor configured for performing the following operations, during a current phase:
    - selecting a level of flux from among the set of discrete predetermined levels of flux;
    - controlling the power part of the variable speed drive based on the selected level of flux as reference value.

* * * * *